US010391976B2

United States Patent
Outwater et al.

(10) Patent No.: US 10,391,976 B2
(45) Date of Patent: Aug. 27, 2019

(54) SYSTEM AND METHOD FOR WIRELESSLY ROSTERING A VEHICLE

(71) Applicants: Chris Outwater, Santa Barbara, CA (US); William Gibbens Redmann, Glendale, CA (US)

(72) Inventors: Chris Outwater, Santa Barbara, CA (US); William Gibbens Redmann, Glendale, CA (US)

(*) Notice: Subject to any disclaimer, the term of this patent is extended or adjusted under 35 U.S.C. 154(b) by 0 days.

(21) Appl. No.: 15/078,159

(22) Filed: Mar. 23, 2016

(65) Prior Publication Data
US 2016/0368456 A1    Dec. 22, 2016

Related U.S. Application Data

(63) Continuation of application No. 14/536,981, filed on Nov. 10, 2014, now abandoned.

(60) Provisional application No. 61/902,596, filed on Nov. 11, 2013.

(51) Int. Cl.
| | | |
|---|---|---|
| *B60R 25/30* | (2013.01) | |
| *B60R 25/04* | (2013.01) | |
| *B60R 25/25* | (2013.01) | |
| *B60R 25/24* | (2013.01) | |

(52) U.S. Cl.
CPC ............ *B60R 25/302* (2013.01); *B60R 25/04* (2013.01); *B60R 25/24* (2013.01); *B60R 25/25* (2013.01); *B60R 2325/101* (2013.01); *B60R 2325/103* (2013.01); *B60R 2325/205* (2013.01)

(58) Field of Classification Search
CPC ....... B60R 25/302; B60R 25/25; B60R 25/24; B60R 25/04; B60R 2325/103; B60R 2325/101; B60R 2325/205
USPC .................................................. 701/2
See application file for complete search history.

(56) References Cited

U.S. PATENT DOCUMENTS

| | | | | |
|---|---|---|---|---|
| 2008/0150683 A1* | 6/2008 | Mikan | ............... | G07C 9/00309 340/5.31 |
| 2010/0148923 A1* | 6/2010 | Takizawa | ............ | B60R 25/2018 340/5.82 |
| 2013/0295900 A1 | 11/2013 | Hood | ............................ | 455/418 |

* cited by examiner

*Primary Examiner* — Brian P Sweeney
(74) *Attorney, Agent, or Firm* — Clifford H. Kraft

(57) ABSTRACT

A system and method for wirelessly generating a roster of drivers and passengers in transportation vehicles. A driver's or passenger's smartphone can communicate using short-range communications with the vehicle, or a smartphone in the vehicle, so that the ID associated with the phone can be linked to a vehicle ID, date and time stamped, and stored in a log or database. Any unauthorized person can be refused admittance (by not permitting the vehicle to start or otherwise being denied the right to be a driver or passenger). A downloaded application is used for this purpose. The invention also can include a secure, remote database as well as a mobile device such as a smartphone running the application, a wireless receiver/transmitter in the vehicle, and a wireless communication network such as a cellular network.

21 Claims, 6 Drawing Sheets

SYSTEM AND METHOD FOR WIRELESSLY ROSTERING A VEHICLE

BACKGROUND

Field of the Invention

The present invention relates generally to the field of transportation and more particularly to a system and method for automatically generating a roster of who plans to drive, who is currently driving, who has driven, and a list of passengers for a particular vehicle.

Description of the Problem

There are many instances where it would be valuable to track who has driven a vehicle and/or who has ridden in it as a passenger. This is especially true with vehicles that need location and/or data tracking. This can include commercial and fleet vehicles as well as rental and other vehicles such as van pools, car sharing, school buses, other buses, taxis and private vehicles. While in many cases, a vehicle is an automobile, truck or van, it may also be an aircraft, watercraft, train or any other vehicle that has a driver or can carry passengers. In some cases, the vehicle may be an autonomous vehicle with no driver.

In a commercial setting, while the monitoring and tracking of fleet vehicles has been the subject of significant automation, the remaining tasks of identifying who takes out a vehicle and maintaining a passenger manifest can often be a cumbersome, time-consuming process in which the driver has to fill out forms and also get a key at a specific location or administrative office. This can take a lot of time and is open to human error.

Certain vehicles, whether passenger cars, vans, buses, even planes and trains, often have a list of authorized drivers, or pilots, and also a list of passengers. Passengers can be part of a known group (herein, those registered on a, "passenger roster network,"), or, unknown, or a guest. Unknown riders can be invited to register on the passenger roster network.

The manual process of rostering the vehicle, i.e., recording the name(s) or other identification of the driver (pilot, engineer, etc.) as well as all possible passengers can be tedious and error-prone. It is especially difficult to accomplish in vehicles where passengers may ingress or egress mid-route as part of the normal service, or where drivers may change in-route.

It would be advantageous to have a system and method that could automatically and wirelessly roster a vehicle in real-time as drivers or passengers enter or leave the vehicle. This can be done with modern wireless technology. With wireless communication from a mobile device that is logically connected to the device owner's identity, this process can become easier, faster and less complicated while at the same time adding security.

SUMMARY OF THE INVENTION

The present invention relates to a system and method for automatically, and wirelessly, generating and keeping a roster of drivers and passengers in transportation vehicles. A vehicle occupant recognition module may operate by recognizing a driver's or passenger's cellular telephone or smartphone. The wireless device, for example, a smartphone, can communicate using short-range communications, for example BLUETOOTH™ or RFID that can be detected within the vehicle so that the ID associated with the phone and corresponding to the occupant, can be dynamically associated to a vehicle ID, date- and time-stamped when first recognized or for some interval of time. The associations are stored in a log or database.

In some embodiments, the vehicle occupant recognition module may comprise cameras that monitor the driver's seat and/or passenger area(s) and use face recognition software or services to make identifications of the vehicle occupants. Face recognition by the vehicle occupant recognition module can verify or supplant identifications made using short-range communication channels (e.g., BLUETOOTH, RFID).

In some embodiments, an unauthorized person can be refused transport by not permitting the vehicle to start, or otherwise being denied the capability of being a driver, and in some cases further being denied being a passenger. Thus, the system can provide improved security in addition to improved record keeping. In other embodiments, a driver and/or passenger's smartphone may have an application or access to a web site tailored to interact with the vehicle occupant recognition module or rostering system. Such interactions may include any of enrolling a new user, which may include registering a photograph; registering a national ID, such as a passport or driver's license, communicating the phone ID to the occupant recognition module, verifying a user (e.g., by entering a PIN code, password, or other security measure, which could be biometric). The rostering system further comprises access to a secure, remote database with a mobile device (such as a smartphone), in-vehicle computer, or other (e.g., desktop) computer running the application, a wireless receiver/transmitter in the vehicle allowing connection to the remote portions of the rostering system, and uses a wireless communication network such as a cellular network.

Communication between the smartphone and the vehicle can be via short-range communications.

DESCRIPTION OF THE FIGURES

Several drawings are now presented to illustrate features of the present invention.

Figure 1:
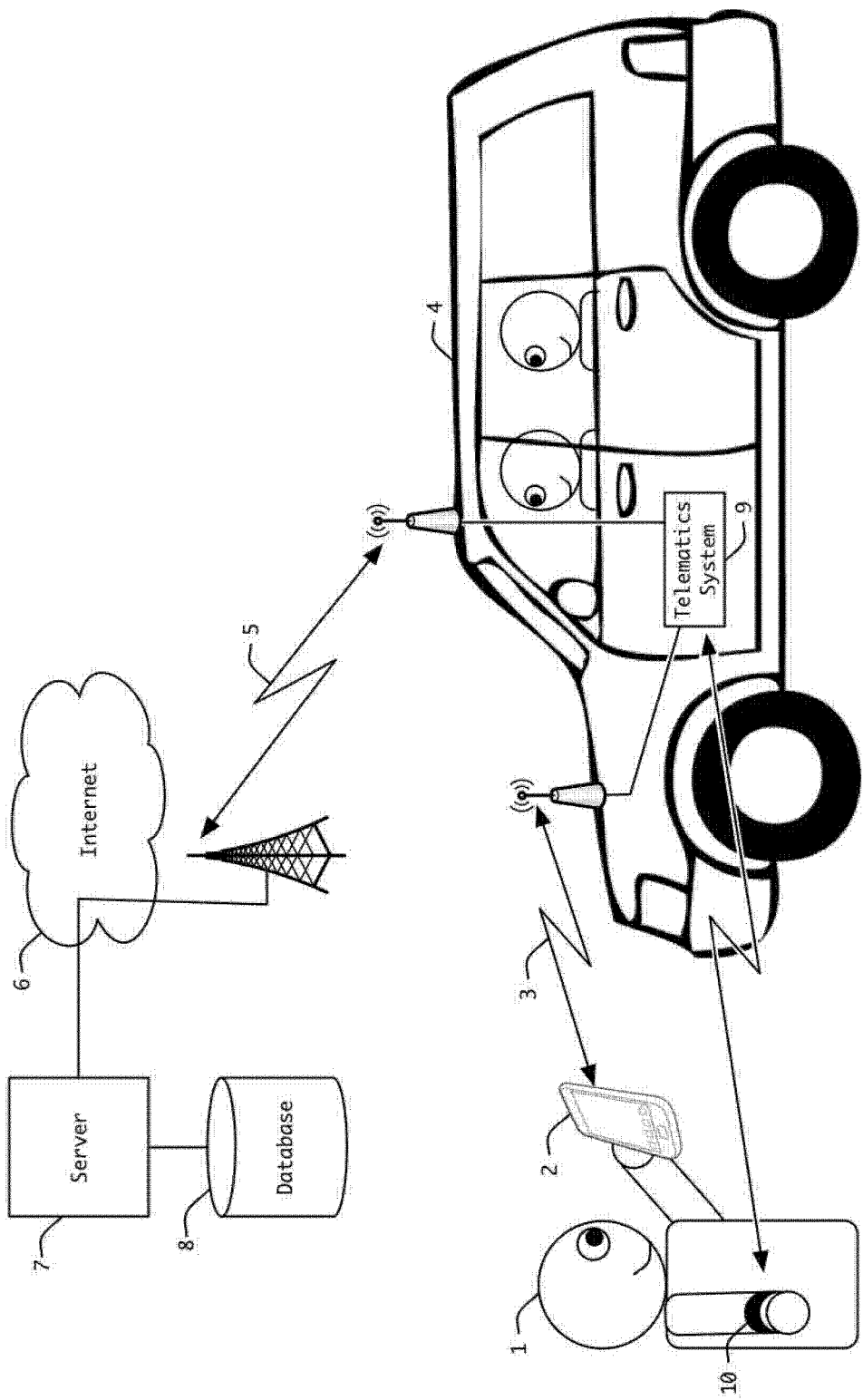
FIG. 1 shows a diagram of an embodiment of the rostering system of the present invention used with a motor vehicle having an installed roster capability.

Drawings and illustrations have been presented to aid in understanding the present invention. The scope of the present invention is not limited to what is shown in the figures.

DETAILED DESCRIPTION OF THE INVENTION

The present invention relates to a system and method for automatically generating and keeping a roster of drivers and passengers in transportation vehicles. By vehicle, we mean any road or off-road vehicle, aircraft, train, watercraft or any other means of transportation of any type, including heavy equipment, such as cranes. The present invention includes an occupant recognition module able to determine drivers and/or passengers in a vehicle, date and time stamp in records stored in a log or database the occupants recognized. Further, in some embodiments, an unauthorized person can be refused admittance or transport, e.g. by not permitting the vehicle to start if the driver is not authorized, or if a passenger is not authorized, or otherwise being denied access as a driver or passenger. In some embodiments, this may include unlocking the vehicle, so that only recognized, authorized individuals can open the vehicle with the occupant recognition module.

In a preferred embodiment, the occupant recognition module transacts with a driver's or passenger's cellular telephone or smartphone and communicates using short-range communications so that the ID associated with the phone (e.g., a media access control, or "MAC" address, BLUETOOTH™ device address, or "BDADDR" or other unique identifier associated with the phone) can be dynamically associated with a vehicle ID as an occupancy record. Over time, the occupancy records of a vehicle constitute its roster.

In an alternative embodiment, cameras may monitor the driver's position (e.g., driver's seat) and/or may monitor the passenger area(s).

By passenger, we mean any person or animal or living thing that can be identified. By driver, we mean any person capable, authorized, and positioned (e.g., seated) to operate the corresponding vehicle including an operator, pilot, engineer, conductor, captain or the like. Thus, by only registering capable individuals as drivers, only authorizing their use of particular vehicles, the rostering system can determine when a vehicle is being driven by a capable, authorized individual.

Some embodiments further limit driving access to only registered drivers, for example by disallowing the vehicle to start unless an authorized driver is detected. In some embodiments, an unauthorized person can be refused transport as a passenger by not permitting the vehicle to start, or otherwise flagging access by an unauthorized passenger (e.g., an audible or visible warning). Thus, the system can provide improved security in addition to improved record keeping.

In a preferred embodiment, the present invention uses a driver or passenger's smartphone with a downloaded application that can be tailored to this purpose. The preferred embodiment also can include a secure, remote database as well as a mobile device such as a smartphone running the application, a wireless receiver/transmitter in the vehicle, and a wireless communication network such as a cellular network. Communication between the smartphone and the vehicle can be via short-range communications such as BLUETOOTH™ or other technique.

Certain vehicles, whether passenger cars, vans, buses, planes and trains, often have a list of authorized drivers, or pilots, and also a list of passengers. Passengers can be part of a known group, or be unknown, or a guest. The passenger can be invited to or required to download an application and immediately use their smartphone to register on the passenger roster network. It is known in the art that owner's of mobile devices can securely tie their identity to their device by virtue of a password and also by biometrics. Several companies, such as Apple Inc. of Cupertino, Calif. with their Touch ID fingerprint reader in their iPhone 6 smartphone, and LaserLock Technologies of Washington, D.C. with their VerifyMe™ smartphone application, offer ways to connect the identity of a person to their mobile device using biometrics, such as fingerprint, facial recognition, voice recognition, and the like. Although there can be exceptions, such as the case of a stolen or found phone, it is true with a very high confidence level that a mobile device carried into a vehicle is probably being carried by its authenticated owner. This could be confirmed by having a password or personal identification number (PIN), in either case a token that the owner knows, is also required to register a mobile device in a vehicle, and whether this is required would be a matter of policy.

Once the ownership is created and verified, the mobile device can be used by the owner as an ID token that can wirelessly communicate with an on-board device and transmit data, such as a digital certificate, which was sent to the owner's mobile device over a wireless network. This certificate can be used to open a car door or enable the vehicle to be driven.

A particular embodiment of the present invention both allows access to a vehicle by a driver, and registers non-drivers, i.e., passengers that enter and exit the vehicle. This process includes location and date- and time-stamp along with the secure ID of one or more of the mobile device bearers. The combination of passenger identification, authentication, permission, location, entry and exit of a vehicle is very valuable data for many classes of transportation asset owners, from parents who let their children take out the family car, to a school, or a corporation or government agency that wants to track drivers and passengers who travel in their vehicles.

Typically, when a driver or passenger enters the vehicle, the ID data acquired from their smartphone is sent to a remote server that can access a remote database of rules as to when driver or passenger's access is allowed or denied. The rules could also reflect the route and expected time required to execute the route, and stations along the route. For example, that database can contain the names and other ID information of authorized drivers (pilots, engineers, captains, etc.), and it can contain an allowed passenger list. In some embodiments of the invention, arbitrary passengers are allowed to ride. In this case, new passengers can simply be added to the roster with date/time stamps as they enter or leave the vehicle. Any other pertinent information, such as destinations, can also be stored in the database.

FIG. 1 shows a diagram of one example embodiment of the present invention that uses a smartphone in communication with a vehicle, and the vehicle in communication with a remote server and database. A potential rider 1 possessing a cellular telephone or smartphone 2 approaches a vehicle 4 in order to enter the vehicle. The smartphone 2 communicates wirelessly 3 with the vehicle 4 using a low power local communication system like BLUETOOTH™, and more particularly with either a computer or telematics system 9 in the vehicle 4. In turn, the telematics system 9 communicates over a network 6, e.g., comprising the Internet, with a remote server 7 by using a wireless connection 5 such as the cellular telephone system. The remote server 7 has access to a remote database 8 where the identity of the person 1 or telephone 2 can be ascertained, and the fact that the person is riding can be logged.

It is not certain that every rider approaching a vehicle will have a mobile device with wireless communication, such as a smartphone 2 having BLUETOOTH™, near-field communications (NFC), and/or other wireless capability. Nor must every rider have downloaded the passenger roster application into their smartphone, which is designed to communicate wirelessly with an on-board computer or telematics system 9. Therefore, an employee or guest, as potential rider 1, who wishes to travel in vehicle 4 could receive a physical wireless tag, token or dongle, such as an RFID tag 10, that is securely tied to their identity by virtue of a driver's license, or passport, or some other acceptable photo ID. The token could also be a tag or bracelet (as shown) to be worn by the passenger during travel.

If the potential passengers do have a smartphone 2, the roster application could be sent to them by the authorizing entity, or could be transmitted to their device via near field communication, such as "tap and share" known in the art. In this way, the on-board device could first transfer the mobile phone application to a new passenger or driver and then, in the next step, accept that person as a passenger in the vehicle. Once the roster application is resident on the mobile phone, it can be carried to other vehicles as an ID token.

The on-board computer or telematics system 9 can include a BLUETOOTH™ or near-field communication (NFC) or some other wireless transmission capability 3, a local memory chip, clock, a form of external wireless communication, such as a cellular modem, a global positioning system (GPS) receiver, and in some embodiments, a secure connection to access to the operation of the vehicle. In a preferred embodiment, the on-board device 9 can be integrated into the dashboard and internal operations of the vehicle. Examples of systems suitable to be adapted to incorporate the present invention include vehicle dashboard systems such as ENTUNE™ by Toyota, or ONSTAR™ by General Motors, and SYNC™ by Ford and others.

However, the proposed manufacturer integration of the present invention could take a long time. Therefore, a device 9 can also be provided with all of the above features. Such a device could be powered by a battery of its own, or by connection to a power source in the vehicle. Such a device may be mounted such that any passenger in the vehicle can wirelessly communicate with the on-board device 9, or touch the device 9 with their mobile device. Device 9 could be present strictly to monitor the passengers and entry and exit events and locations, but in other embodiments could be connected to the vehicle in such a fashion as to be able to control (or inhibit) the operations of the vehicle, in this way being able to allow only authenticated drivers and passengers to travel in the vehicle. The device might also prevent the vehicle from starting or moving if an unregistered or unexpected individual is at the wheel, or if a passenger with a different destination is in the vehicle, or if a passenger without a security clearance is in a vehicle headed for a secure area.

This might serve to limit the number of passengers, or the types of passengers, or not allow a vehicle to leave with passengers who are not intending to go to the same destination. The application may advise a passenger (or likewise, a driver) accordingly: "Hello, Jim. Sorry, but you are on the wrong bus. This bus is headed to New Haven. You are going to West Haven."

In another embodiment, the on-board device 9 has a GPS and wireless communication, such as BLUETOOTH™ and NFC; however, does not have a wireless modem, perhaps for cost reasons. In this embodiment, one or more traveler's mobile device 2 could act as a data carrier, or data "mule" as described in the present inventors' Ser. No. 13/429,439 filed Mar. 26, 2012 entitled "METHOD AND APPARATUS FOR FINDING AND ACCESSING A VEHICLE FUELING STATION, INCLUDING AN ELECTRIC VEHICLE CHARGING STATION"

This technique of allowing multiple, redundant, individual carriers of data back to the secure, remote database, can be more robust than a single cellular modem transmitting from the vehicle.

The vehicle typically needs to have a local communication connection available, to which any passenger in the vehicle running the application would automatically connect (e.g., via BLUETOOTH™) so to be registered as a passenger, as there can only be one driver in a typical motor vehicle. For watercraft and aircraft there can be multiple "pilots" and the application can be configured to handle this if intended for "multi-pilot" vehicles. Thus, by virtue of existing mobile devices, existing BLUETOOTH™ technology in mobile devices and in vehicles, mobile device cameras, and a mobile device application, the present invention offers a method for securely gathering and communicating data about drivers and passengers in a "transportation" event that could be combined with other vehicle location, date and time information to give a clear picture of specific vehicle, driver and passenger identification and movement. The information can be carried and sent back to the secure, remote server and database by any device that is running the application and is in communication with the vehicle or driver or any passenger. It is possible that the same data is sent several time to the remote, secure server and the redundancy is parsed and removed at a back-end server.

Figure 2:
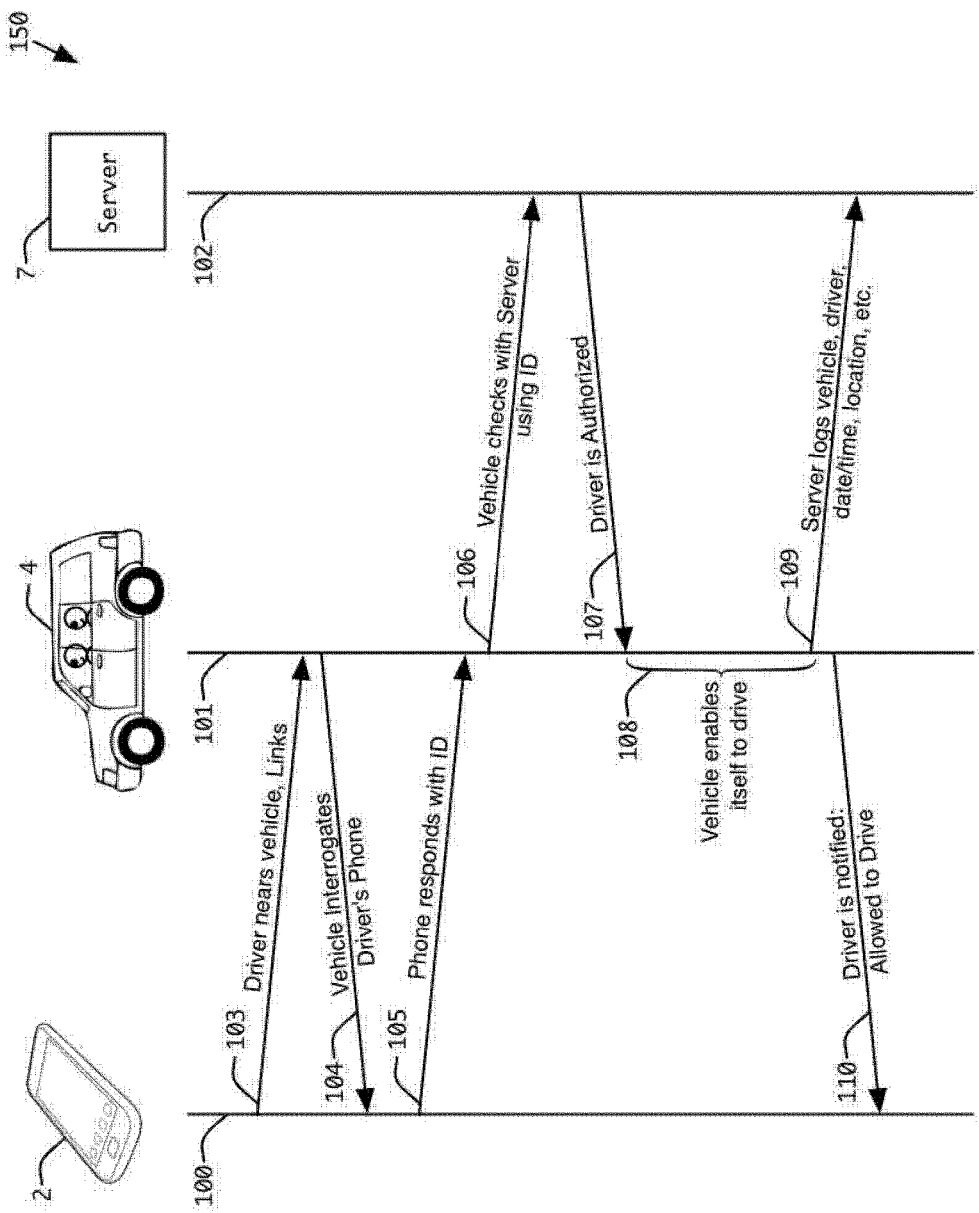
FIG. 2 shows a possible time-sequence chart of events taking place when a driver enters a vehicle.
Figure 3:
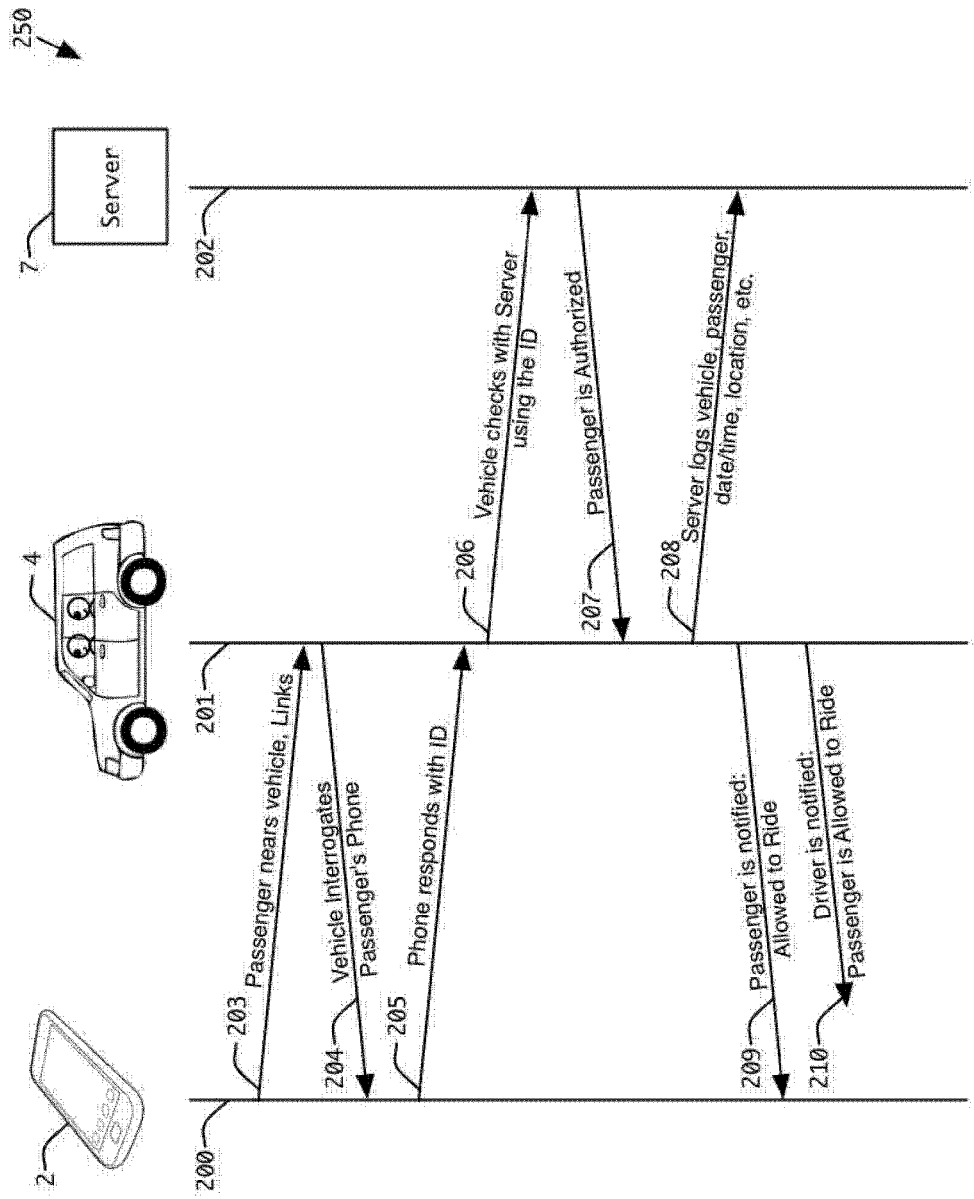
FIG. 3 shows a possible time-sequence chart of events taking place when a passenger enters a vehicle.

FIG. 2 shows a driver registration transaction process 150, illustrating events that can occur when a driver enters a vehicle. In this example, the person 1 in FIG. 1 is to be the driver of vehicle 4. The driver's smartphone 2 or other device 10, represented in FIG. 2 by vertical line 100, communicates with the vehicle 4, represented by line 101, which in turn communicates with a remote server 7, represented by line 102 over a network. As the driver approaches the vehicle, the driver's smartphone 2 pairs up or otherwise links 103 with the vehicle. The vehicle interrogates 104 the driver's phone and demands ID. The ID can be stored in the phone, or more preferred, taken at that time such as a fingerprint or other biometric ID. The driver's phone returns 105 the ID to the vehicle. The vehicle then sends a request 106 to a remote server. The remote server checks if the driver is allowed to drive this particular vehicle at this time. If so, the remote server returns an authorization 107 to the vehicle. The vehicle's installed system then unlocks or otherwise enables 108 the vehicle for driving. The remote server is notified 109 whereupon it logs the vehicle, driver, date, time, location and any other relevant information. The vehicle also sends a clearance 110 to the driver's phone notifying that the vehicle is enabled and ready to drive. In some embodiments of the present invention, the driver might also be required to prove that he or she is in condition to drive, for example by blowing into a breathalyzer installed in the vehicle, or taking an alertness test, before the vehicle enables 108 itself for driving. A bad report in this case would not only keep the vehicle disabled, but also send a message reporting the fact to the remote server. FIG. 3 shows a passenger registration transaction process 250, illustrating events that can occur when a passenger enters a vehicle 4. The passenger's smartphone 2 or other device 10, represented by line 200, communicates with the on-board device in vehicle 4, represented by line 201, which in turn communicates with a remote server 7, represented by line 202, over a network. As the passenger approaches the vehicle, the passenger's smartphone pairs or otherwise links 203 with the vehicle, or a dongle carried by the passenger notifies the vehicle of the passenger's approach. The vehicle interrogates 204 the passenger's phone or dongle and demands ID. The ID can be stored in the phone or dongle, or more preferred, taken at that time such as a fingerprint or other biometric ID. The passenger's phone returns 205 the ID to the vehicle. The vehicle then sends a request 206 to a remote server. The remote server checks if the passenger is allowed to ride in this particular vehicle at this time. If so, the remote server returns an authorization 207 to the vehicle.

The remote server is notified 208 whereupon it logs the vehicle, driver, date, time, location and any other relevant information concerning the passenger. The vehicle also sends a clearance 209 to the passenger's phone notifying that the passenger can board. Likewise, a clearance 210 may be sent to the driver (the driver's smartphone is not shown in FIG. 3).

Figure 4:
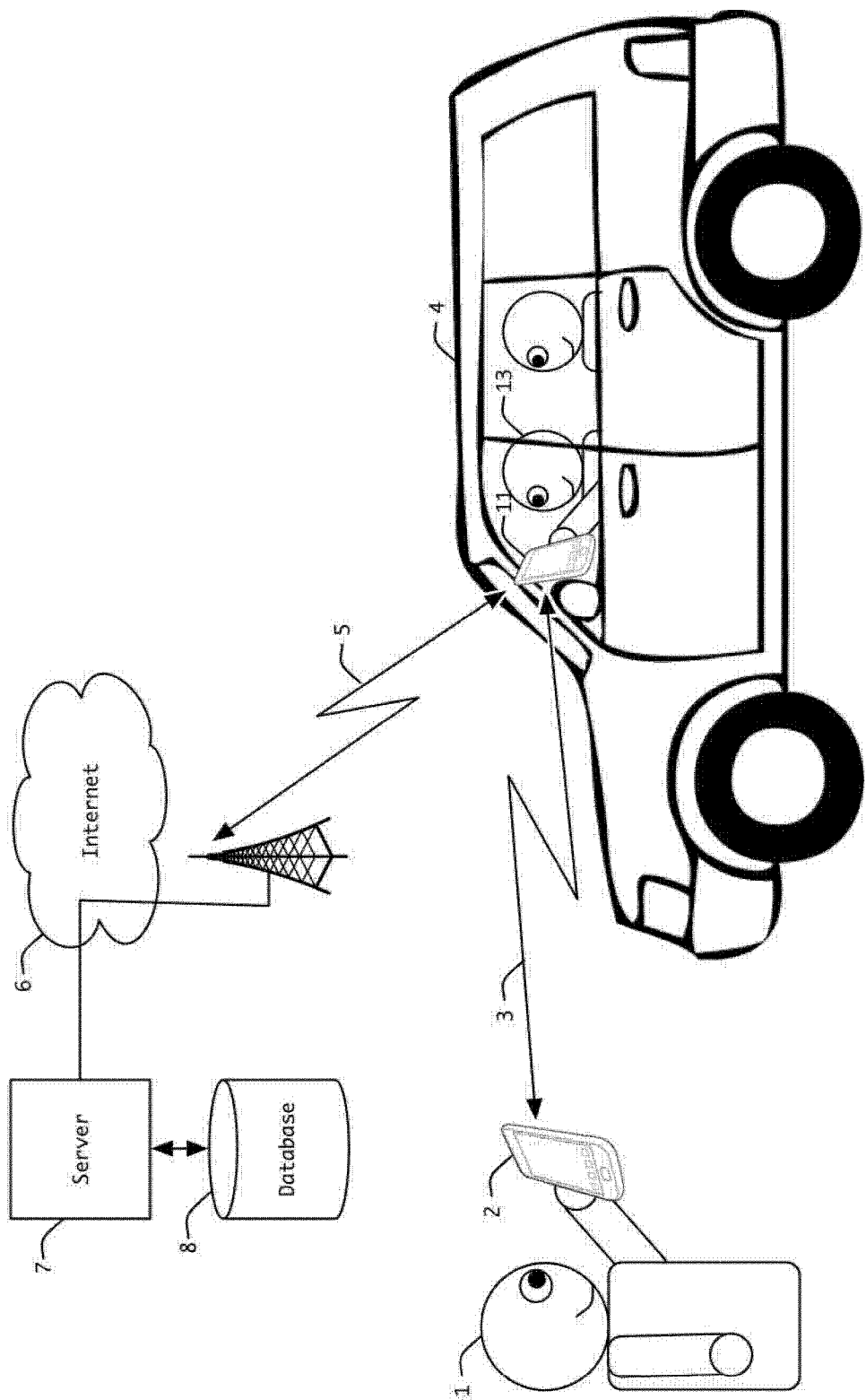
FIG. 4 shows a diagram of an embodiment that uses a "data mule" technique.

In another and least expensive embodiment shown in FIG. 4, there is no required on-board device. This embodiment uses a data "mule". The driver 13 is running the authorized roster application on his smartphone 11. Smartphone 11 communicates with server 7 using a wireless connection 5 (e.g., the cellular telephone system). Driver 13 designates that he is the driver. He connects smartphone 11 with the vehicle BLUETOOTH™ system (not shown in FIG. 4) and is then known to be in the vehicle 4. This information is date and time stamped. The process can also include facial recognition via a photographic image from the driver's smartphone 11. This photographic image can be taken from a either forward or reverse camera on the smartphone and can also be a short video clip of the driver, and passengers, if any. There can be a simple smartphone holder (not shown) on the dashboard, to hold smartphone 11 in position while it intermittently takes images of the occupants from the front center of the vehicle looking back into the cabin. Capture of facial images and facial recognition processing are not required for the roster system of the present invention to work, but when added, provide additional information about the driver, and passenger(s), if any. In this simplest embodiment the driver's mobile device 11 acts as the on-board device and simply needs to be running a version of the roster application. The smartphone 2 of a passenger 1 in FIG. 4 communicates over wireless connection 3 with the driver's smartphone 11 in accordance with passenger registration transaction process 250 of FIG. 3, with smartphone 11 performing in the role of the on-board computer represented by line 201. With respect to the driver registration transaction process 150 of FIG. 2, the driver's smartphone 11 takes on both roles of the smartphone represented by line 100 and the on-board device in vehicle 4, represented by line 101, with the result that transactions 106, 107, and 109 are conducted between the server 7 and smartphone 11.

In another embodiment, there is also no need for local communication, such as BLUETOOTH™, between the vehicle 4 and smartphone 11 (or 2). Secure identification of the vehicle 4 can be handled optically by taking a picture of, or otherwise scanning, indicia such as a barcode, quick response (QR) code, the vehicle license plate, or the like, that identifies the vehicle. Smartphone barcode scanning and license plate recognition are well known in the art. The barcode scan of the vehicle by at least one person, such as the driver or any passenger running the application, will suffice. This data, along with GPS reading, or other location data from the one or more smartphones running the application or in wireless contact with at least one phone in the vehicle that is running the application, can give location and vehicle identification along with a date and time stamp. This data can then be merged with more optical data from driver and passenger facial images captured by at least one smartphone, preferably the driver's, and these facial images along with location data from at least one or a multiple of smartphones in the vehicle and date and time stamps, provide adequate information to the remote server.

For the data "mule" method, this information is carried by one mobile device (or more, for redundancy) running the application. Images of driver and passenger faces can be taken intermittently, and the system is fully programmable and flexible. Facial images can be directed to any of several databases for identification, either a database voluntarily subscribed to by passengers such as fleet drivers or other employees, or to other databases such as police, or military databases. In a secure access setting, the vehicle itself may wirelessly project, or broadcast, using an RF system, the identification of the driver and passengers it is carrying. Facial recognition cameras at the access point might photograph the interior of the vehicle in order to verify the broadcasted roster.

The images can be taken openly or discretely, voluntarily or surreptitiously, depending on the policy of the entity that owns the vehicle. In this embodiment, there is only need for a single, unique identifier of the vehicle, such as a barcode or other indicia, one passenger, preferably the driver, and in some cases only the driver, a smartphone with a camera that is running the roster application, some data storage capability common to most smartphones, and a cell phone network connection, which can be delayed or real-time.

For convenience, a centrally located "high on the dashboard" holder for the smartphone running the application can be provided. Other smartphones running the application, and carried by any of the passengers, can also be gathering optical data from different angles within the vehicle adding to the robustness of the identification process. Smartphones can also be facing out of the vehicle, and can be triggered to capture images and date and time stamps based upon reaching a specific location, on imaging a scene or light pattern outside the vehicle, such as a bridge or tunnel or intersection, and can also be based on location as determined by at least one of the smartphones in the vehicle.

Figure 5:
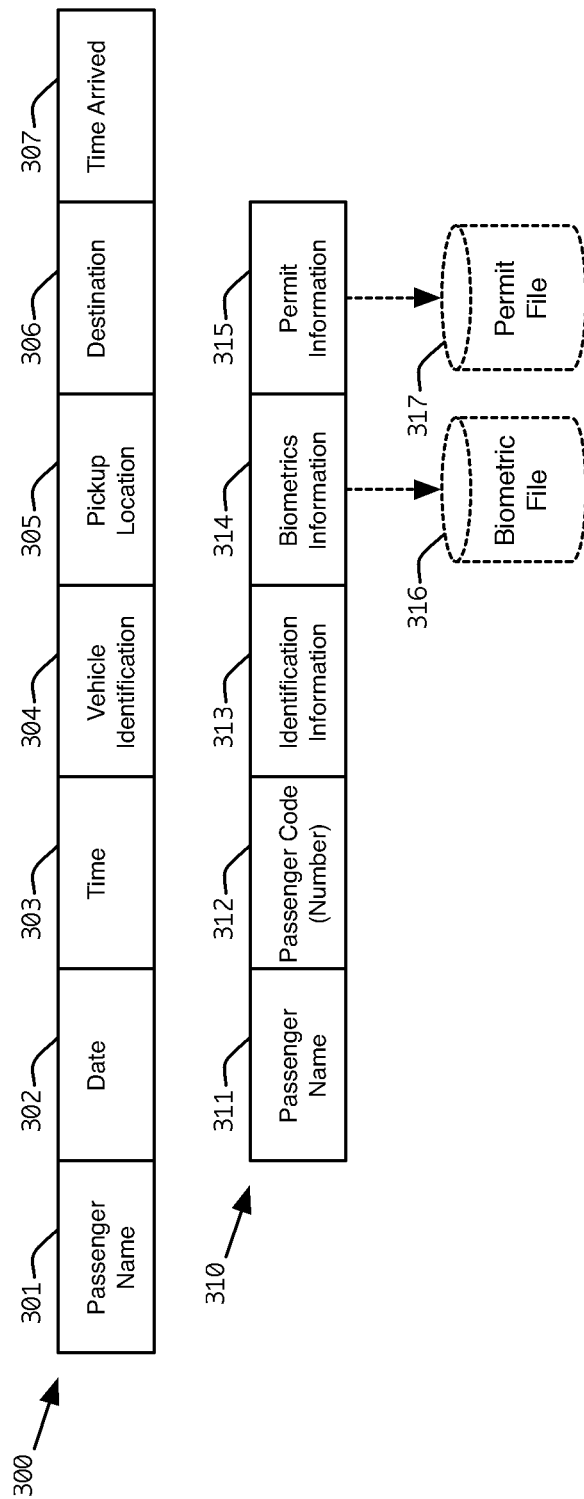
FIG. 5 shows an example of records stored in a remote database.

FIG. 5 shows possible records that can be stored in the remote database. A passenger permit record 310 may comprise the passenger name 311; a code 312, such as a number or hash for that passenger; identification information 313, e.g., a social security number or driver's license number; biometric information 314, which can be representative of actual biometric data, or a pointer to a separate biometrics file 316; and permit information 315, which can be the actual permit data, or a pointer to a permit file 317. The permit file 317 gives the allowed trips that passenger is permitted to take along with dates and the like. When a passenger actually boards a vehicle, a trip record 300 can be created. This contains the passenger's name 301, date 302, time 303, vehicle ID 304, pick up location 305, and destination 306. The end-of-trip time or arrival time 307 can also be entered to close the record. While FIG. 5 shows examples of a database, any database and any records or entries are within the scope of the present invention.

Figure 6:
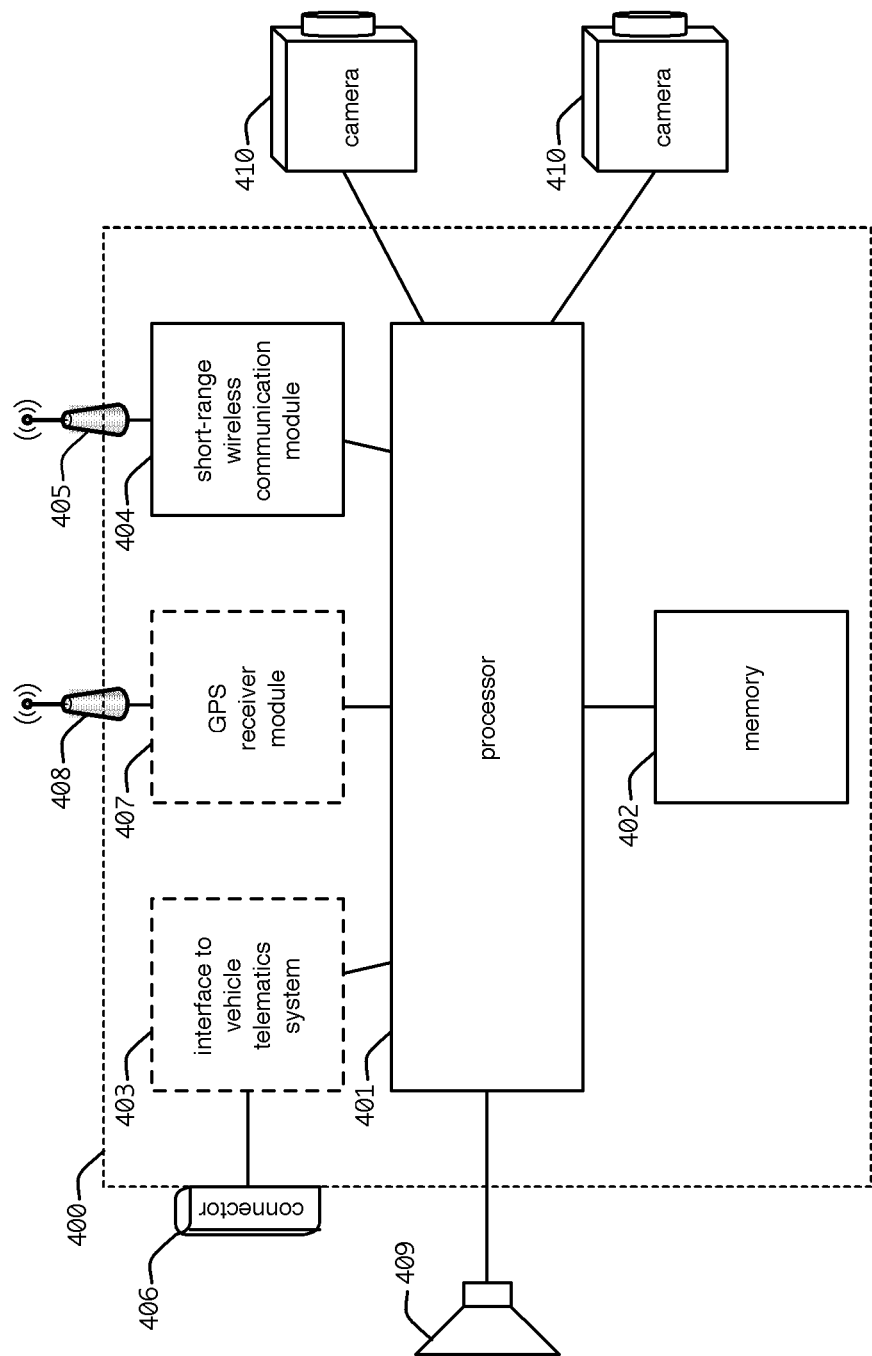
FIG. 6 shows a block diagram of a vehicle on-board rostering system.

FIG. 6 shows one example embodiment for an on-board vehicle rostering module 400. This unit is either temporarily or permanently mounted or located in the vehicle 4. It includes a processor 401 which can be a microcontroller, microprocessor, PC or other computer or processing unit. The processor 401 interfaces with memory 402. This may be RAM, ROM, Flash, Disk or any other type of memory. The memory 402 may be located in the processor 401, or it may be external. The processor 401 is in electrical communication with a short-range wireless communication module 404, for example a BLUETOOTH™ communication module. When the wireless system is radio, the communication system 404 has one or more antennae 405.

The processor 401 can optionally communicate through a vehicle interface 403 and connector 406 with a vehicle computer system or telematics system. In such an embodiment, the vehicle telematics system can provide wide area communication (e.g., cellular data services as in wireless connection 5 in FIG. 1), location (e.g., via the vehicle's GPS), and navigation.

The on-board rostering system 400 can optionally include a GPS receiver 407 with a GPS antenna 408. This allows the on-board unit 400 to independently determine location. The memory 402 may contain map or location information. The processor 401 may be connected to one or more cameras 410 in the vehicle. This connection can be wired or wireless.

Memory 402 may also store audio greetings or announcements to be played though a speaker 409. The in-vehicle experience can include a voice that greets the passengers by first name, first and last name, or an anonymous recognition if a passenger does not wish his or her name announced. This salutation from the in-vehicle device can be both for passengers entering or exiting the vehicle. The acknowledgment could be as simple as a beep. Further, passengers could listen to the driving, piloting history of the driver or pilot. Such information could also be relayed to a passenger's smartphone. Such reports could also be offered for the history of the vehicle itself. Based on each passenger's profile, and company policy, information about each passenger could also be shared with the driver and among the other passengers. Contact information could be voluntarily shared via the application, using well-known interfaces such as "tap and share". The passenger name information either comes through the vehicle via its own cellular modem from server 202 (e.g., at step 207 in FIG. 3), or can come from the passenger's smartphone 200 when the passenger is first entering a vehicle (e.g., at step 205 in FIG. 3). This also applies in the data "mule" case, where the driver's smartphone 11 is used for the vehicle's role (i.e., line 201). This initial event would happen each time a passenger communicates for the first time with the in-vehicle, roster device. If the device is moved from one vehicle to another, the passenger list remains resident within the vehicle device, but now the device knows that it is associated (paired) with a new vehicle, based on a new vehicle ID number obtained by direct communication with the vehicle.

The data "mule" technique is particularly valuable in vehicles that do not have internal cellular modem contact with a remote network, or for customers who do not want to pay for an in-vehicle device that includes a cellular modem and the corresponding fees required for that data connection. The data "mule" in-vehicle device only needs to have "local" (short-ranged) wireless connections, for example via BLUETOOTH™. Such connections can include the vehicle's on-board system, thus representing the rostering device's current association with a vehicle, and each passenger's smartphone or other mobile device. The passenger connection can be unambiguously initiated with a "tap and share" connection that can include a unique digital certificate, which technology is known in the art.

Embodiments of the present invention use a plurality of local communication enabled devices, such as BLUETOOTH™, installed in vehicles. Passengers can register and pick up secure, encrypted occupancy records (e.g., passenger permit record 310, or trip record 300) from any in-vehicle device and then data "mule" that passenger occupancy data to server 7: the passenger's name, facial image(s), other biometrics, such as fingerprints, vehicle identification, date and time stamp and location(s) back to the network and a remote server. They can also data "mule" this data for other passengers.

The present invention can also get driver's/pilot's records when passengers arrive on-board. "That is how Roster looks out for you." "We research safety records and statistics for the informed passenger". Or, the system can give a "Risk factor" from 1 to 10, or unknown, for travel someone is about to undertake. The present invention can be used to verify car sharing and get special discounts, or be part of a discount or loyalty program. The vehicle and driver can also automatically be tied to an entry/exit or fueling event based on time stamp and location from GPS contained in the in-vehicle device. The system could also include and project access information for passengers in a vehicle approaching an access point. This could also be tied to a License Plate Recognition (LPR) system. The LPR system matches in-vehicle device ID and the data the vehicle broadcasts containing driver and passengers ID's.

In some embodiments, the on-board device can be moved from vehicle to vehicle, if desired. If the vehicle does not give a unique ID code automatically via local communication, or machine-readable indicia are not available to be scanned by the device, then a unique code can be keyed in as part of inter-vehicle transfer.

For example, the device can be sent a code describing which vehicle it is now in, or, a preferred embodiment, the device can pair and bond with a vehicle's installed local communication system, much in the same way a smartphone can pair with a vehicle's microphone and speakers for hands-free telephony. Once this is done, the device is bonded to that vehicle until it is removed and becomes a receiver/transmitter for the next, current target vehicle to record all of the data about the driver and passengers, such as their itinerary and when they entered or exited the vehicle.

The present invention is also a valuable tool for driverless, autonomous vehicles as access and passenger information and tracking will be required in many cases.

In general, the on-board rostering system uses portable telephones for ID capture, and may use cameras and face recognition. Communication is with a secure, remote database. The system can manage drivers and/or passengers. In some embodiments, the vehicle will not start or otherwise function if the driver or another occupant is not authorized. In some cases, the system will communicate that a seat is occupied, by virtue of a seat "weight" sensor, which is known in the transportation industry, but the occupant has not been identified or recognized by the system. In some embodiments, the vehicle may be allowed to proceed and merely log the information; in other embodiments, departure may be prohibited until an identification of the occupant can be successfully completed.

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A method of automatically generating a roster of drivers and passengers for vehicles comprising:
   a) determining an identification associated with a person occupying a vehicle, by a rostering system (RS) at least partially on-board a vehicle, the RS comprising at least one processor having access to a memory, a clock, a wireless communication module, and a database, the determining an identification comprising at least one of:
      a1) establishing communication, with the wireless communication module, between the RS and a mobile device of the person, the mobile device providing the identification to the RS in response to the establishing communication, and a2) taking biometric data of the person with the RS, the biometric data corresponding to the identification;

b) making, by the RS in response to step a), a record in the memory, the record comprising the identification, the record further comprising a time stamp based on the clock; and, c) determining an authentication of the person, by the RS, as authenticated if an identity in the database corresponds to the identification and not authenticated otherwise;

d) wherein steps a), b), and c) are performed, at a plurality of events, for persons occupying the vehicle;

whereby a roster of occupants for the vehicle comprises the records.

2. The method of claim 1 wherein the plurality of events comprises when any person enters the vehicle.

3. The method of claim 1 wherein the plurality of events comprises when any person exits the vehicle.

4. The method of claim 1 wherein the plurality of events comprises a fueling event.

5. The method of claim 1 wherein at least one performance of a) comprises a1) and the identification provided by the mobile device is a unique identifier associated with the mobile device.

6. The method of claim 1 wherein at least one performance of a) comprises a1) and the identification provided by the mobile device is a digital certificate.

7. The method of claim 1 wherein at least one performance of a) comprises a2) and the biometric data of the person is an image of the person, the image captured by a camera of the RS.

8. The method of claim 1 wherein the record further comprises location data obtained by the RS through communication with at least one of any mobile device of a current occupant of the vehicle having the location data, the vehicle wherein the vehicle has the location data, and a global positioning system (GPS) of the RS.

9. The method of claim 1 further comprising:

d) detecting by a weight sensor associated with a seat of the vehicle, the sensor having communication with the RS, that there is an occupant in the seat; and, e) determining by the RS if said occupant in the seat is any person associated with an identification in step a), otherwise making a second record in the memory that no identification is associated with said occupant in the seat, the roster further comprising the second record.

10. The method of claim 9 wherein the RS has communication with the vehicle, the method further comprising:

g) inhibiting departure of the vehicle, by the RS, through communication to the vehicle, at least until an identification of each person occupying the vehicle is determined.

11. The method of claim 1 further comprising the step of:

d) providing an audio acknowledgement from the RS through a speaker in response to at least a).

12. The method of claim 1 wherein the database contains a list of allowed passengers.

13. The method of claim 1 wherein the database contains a list of allowed drivers.

14. The method of claim 1 wherein the record further comprises the authentication.

15. The method of claim 1 wherein the record further comprises an identification of the vehicle, the identification of the vehicle obtained by the RS through an interface to the vehicle that is at least one of wired and wireless.

16. The method of claim 1 wherein the record further comprises an identification of the vehicle, the identification of the vehicle obtained by the RS from an indicium of the vehicle scanned by a camera of the mobile device.

17. The method of claim 1 wherein at least one performance of a) comprises a2) and the biometric data of the person is collected by a biometric sensor of the mobile device and communicated to the RS.

18. A method of automatically generating a roster of drivers and passengers for vehicles comprising:

a) determining an identification, by a rostering system (RS) comprising a processor, a memory, a clock, a wireless communication module, and a database, the identification associated with a person occupying a vehicle, the determining an identification comprising at least one of:

establishing communication through the wireless communication module between the RS and a mobile device of the person, in response to which the identification is provided by the mobile device to the RS, and detecting biometric data of the person by a camera of the RS, the biometric data corresponding to the identification;

b) authenticating the person with the database, if an identity in the database corresponds to the identification and not authenticating the person otherwise; and c) making a record comprising the identity in the memory, the record further comprising a time stamp from the clock and at least one of an identification of the vehicle obtained by the RS through an interface to the vehicle and location data obtained by the RS from a global positioning system;

d) wherein steps a)-c) are performed for each different person occupying the vehicle at a plurality of different times;

whereby a roster of occupants for the vehicle comprises the records.

19. The method of claim 18 wherein the different times comprise at least one of when any person enters the vehicle, when any person exits the vehicle, and a fueling event of the vehicle.

20. The method of claim 18 wherein the biometric data of the person is an image of the person, the image captured by a camera of the RS.

21. The method of claim 18 wherein the vehicle is self-driving.

* * * * *